United States Patent [19]

Brant

[11] Patent Number: 4,934,629
[45] Date of Patent: Jun. 19, 1990

[54] RESCUE VEHICLE

[76] Inventor: Harry Brant, 11619 Pendelton, Sun Valley, Calif. 91352

[21] Appl. No.: 76,037

[22] Filed: Jul. 21, 1987

[51] Int. Cl.$^5$ .............................................. B64C 29/00
[52] U.S. Cl. .................................... 244/2; 244/23 A; 244/137.2; 244/116; 182/63; 182/82; 169/53; 169/70
[58] Field of Search ................ 244/23 R, 23 A, 118.1, 244/118.5, 137.2, 115, 116, 139, 146, 2; 182/63, 82; 169/53, 70

[56] References Cited

U.S. PATENT DOCUMENTS

| | | | |
|---|---|---|---|
| 2,829,846 | 4/1958 | Keiper | 244/139 |
| 2,981,501 | 4/1961 | Schaefer | 244/23 A |
| 3,065,934 | 11/1962 | Jackson . | |
| 3,101,919 | 8/1963 | Madon | 244/116 |
| 3,104,720 | 9/1963 | Sullivan | 169/70 |
| 3,176,795 | 4/1965 | Taylor | 182/82 |
| 3,211,429 | 10/1965 | Stewart | 258/1.4 |
| 3,559,927 | 2/1971 | Baekken | 244/115 |
| 3,888,435 | 6/1975 | Foote . | |
| 3,931,868 | 1/1976 | Smith, Jr. . | |
| 3,933,326 | 1/1976 | Schauffler | 244/118.5 |
| 3,972,493 | 8/1976 | Milne | 244/115 |
| 3,997,135 | 12/1976 | Peterson . | |
| 4,074,790 | 2/1978 | Colbachini et al. | 182/63 |
| 4,105,173 | 8/1978 | Bucker | 244/146 |
| 4,168,748 | 9/1979 | Batte . | |
| 4,171,114 | 10/1979 | Marden | 244/116 |
| 4,195,694 | 4/1980 | Gizzarelli, Sr. . | |
| 4,447,024 | 5/1984 | Williams | 244/23 A |
| 4,640,384 | 2/1987 | Kucher et al. | 182/63 |
| 4,678,141 | 7/1987 | Sarrantonio | 244/2 |

FOREIGN PATENT DOCUMENTS

| | | | |
|---|---|---|---|
| 2104709 | 4/1972 | France . | |
| 2387051 | 11/1978 | France . | |
| 2420355 | 11/1979 | France | 169/53 |

Primary Examiner—Galen Barefoot
Attorney, Agent, or Firm—Lyon & Lyon

[57] ABSTRACT

A rescue craft includes a self-propelled car or elevator type of flying machine for rescuing persons from high-rise buildings, during fires, or other emergencies. The craft is powered by fan-jet engines capable of lifting the unit in vertical take-offs. A cable attached to a ground structure is used to control the craft and facilitate descent to ground level. An internal guidance system provides 360° maneuverability around the cable and facilitates docking against the sides of buildings, etc. The ground structure comprises a flat-bed tractor/-trailer equipped to transport the craft to the scene of an emergency. The ground structure is fully self-contained with diesel power, a winch for the cable, lighting, refueling capability, and is fully ballasted and outrigged and capable of launching and receiving the rescue craft.

17 Claims, 3 Drawing Sheets

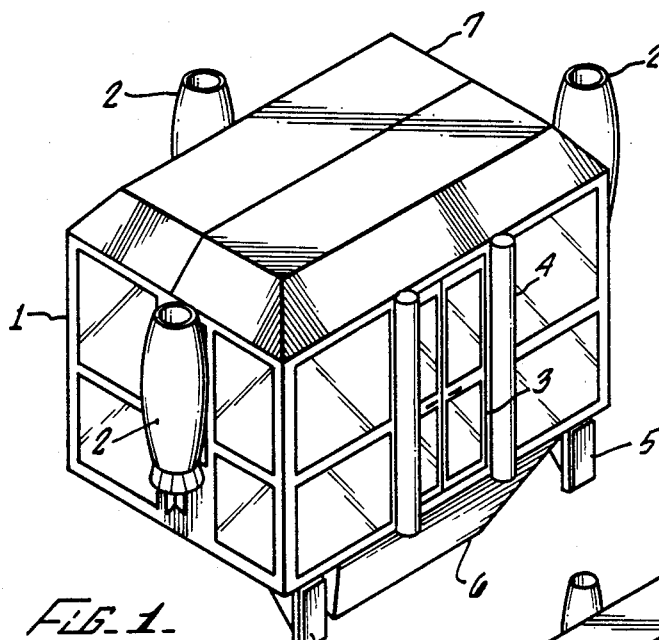
FIG_1_
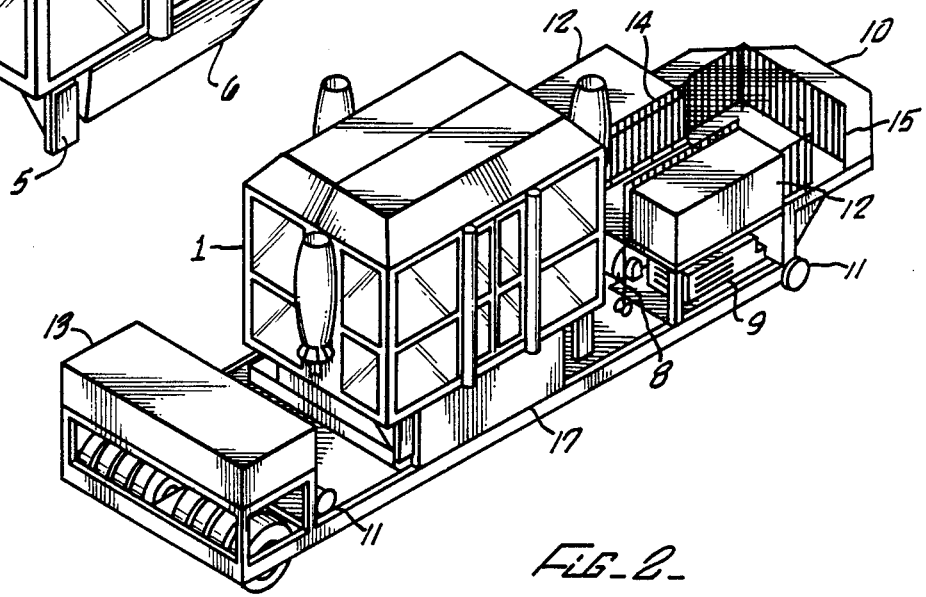
FIG_2_
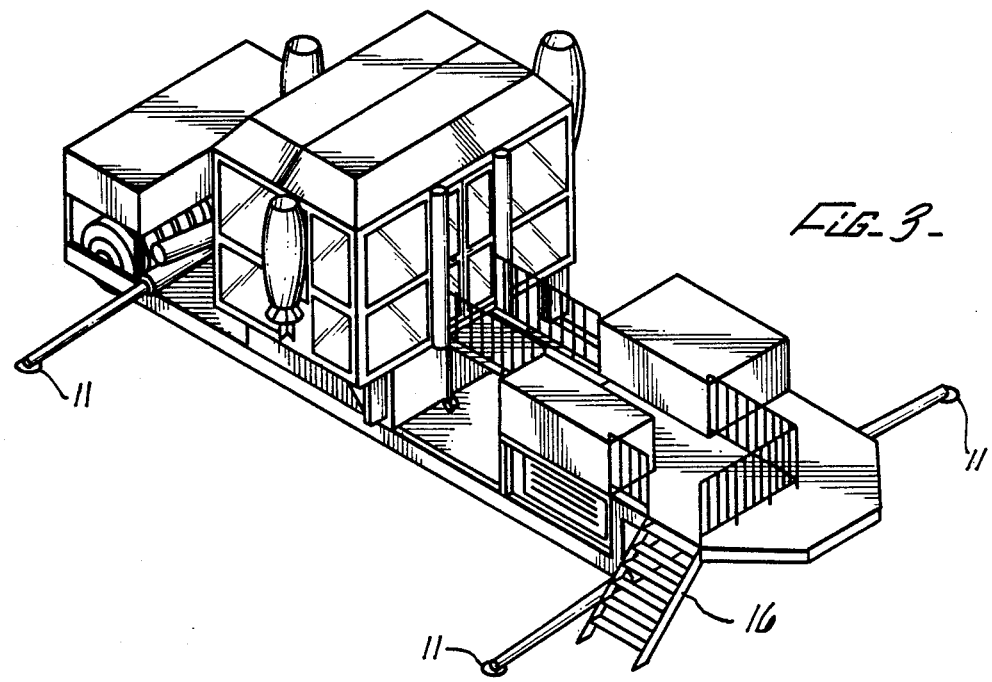
FIG_3_

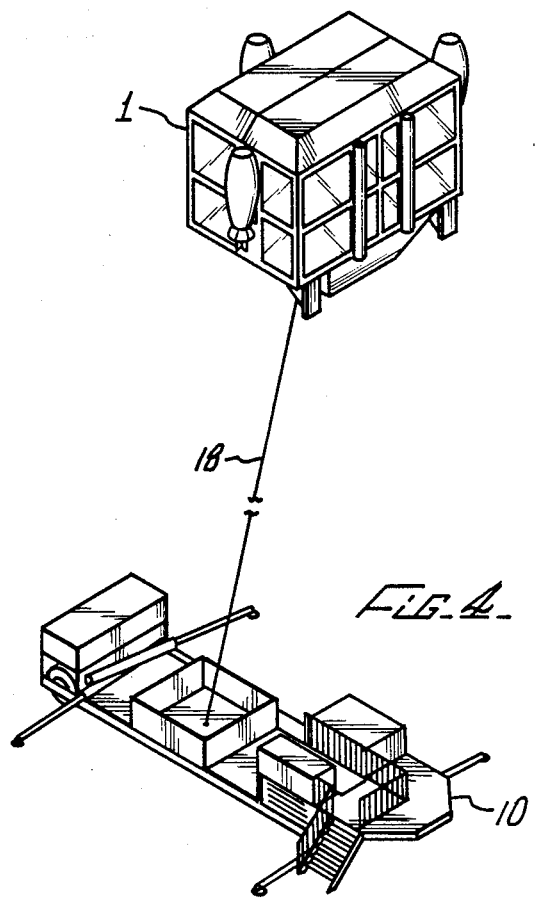
FIG_4.
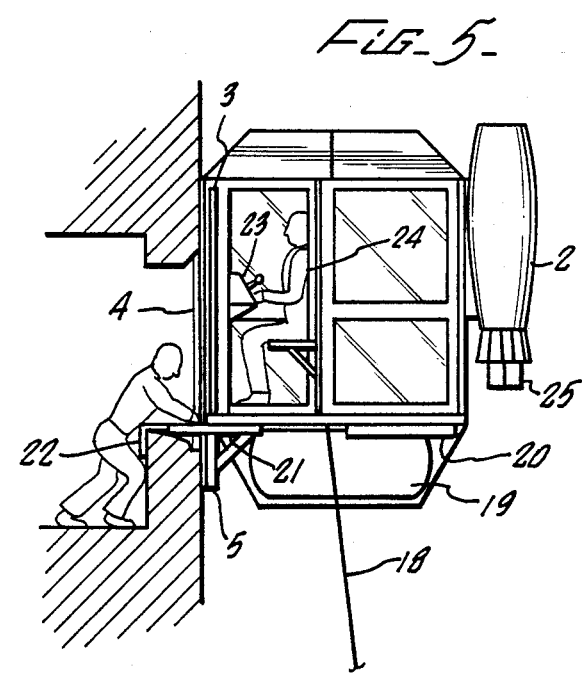
FIG_5.
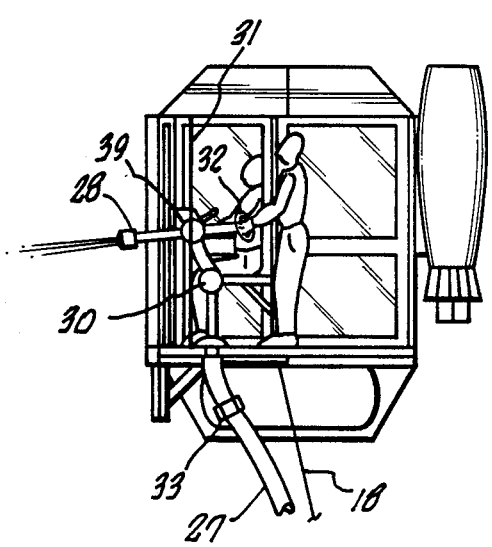
FIG_7.
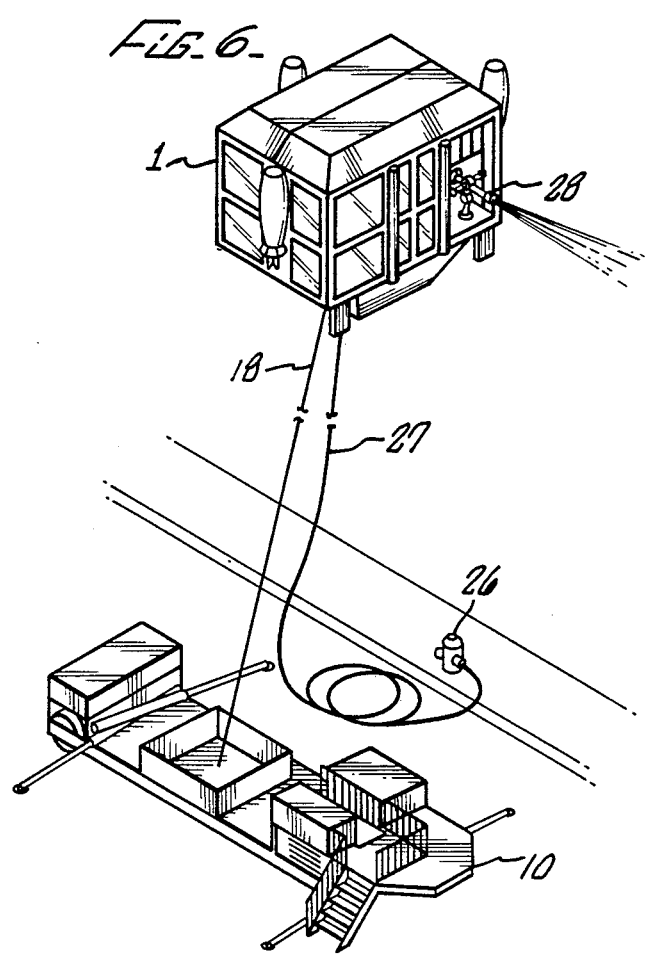
FIG_6.

RESCUE VEHICLE

BACKGROUND OF THE INVENTION

The field of the present invention is emergency equipment, and particularly, apparatus for rescue operations.

Various equipment for use in emergency rescue operations, for example, apparatus for rescuing persons from high-rise buildings in the event of fire, have been suggested. Proposals include helicopters having chairs, cages, or platforms suspended therefrom by means of ropes, slings, etc. Rescue efforts using such equipment have been seriously hampered and virtually abandoned as a result of excessive gyrations caused by rotor downdrafts, upward turbulence caused by fire and downdrafts which typically occur between high-rise buildings. Maneuverability and control are very difficult, if not impossible under these circumstances, and such rescue operations have proven highly dangerous.

SUMMARY OF THE INVENTION

The present invention is directed to a device for use in rescue operations involving high-rise buildings, towers, ledges or other situations where persons are entrapped at some height above the ground. To this end, a rescue craft is provided with power means to lift the craft to the desired elevation, and control means to maneuver the craft against a building or the like. Retaining means are provided connecting the craft with a base structure to improve stability and assist in lowering the craft to the ground.

BRIEF DESCRIPTION OF THE DRAWINGS

FIG. 1 is a perspective view of a rescue craft constructed in accordance with the present invention.

FIG. 2 is a perspective view showing the rescue craft of FIG. 1 and its associated ground structure.

FIG. 3 is a perspective view of the rescue craft and ground structure shown in FIG. 2 depicting the ground structure stabilizing means.

FIG. 4 is a perspective view showing the rescue craft in flight above the ground structure.

FIG. 5 is a cross-sectional view of the rescue craft shown in FIG. 1 wherein the rescue craft is positioned adjacent a building for boarding operations.

FIG. 6 is a perspective view of a rescue craft and ground structure wherein the rescue craft is used for fire-fighting operations.

FIG. 7 is a side view of the rescue craft shown in FIG. 1 being used in fire-fighting operations.

DETAILED DESCRIPTION OF PREFERRED EMBODIMENTS

Figure 8:
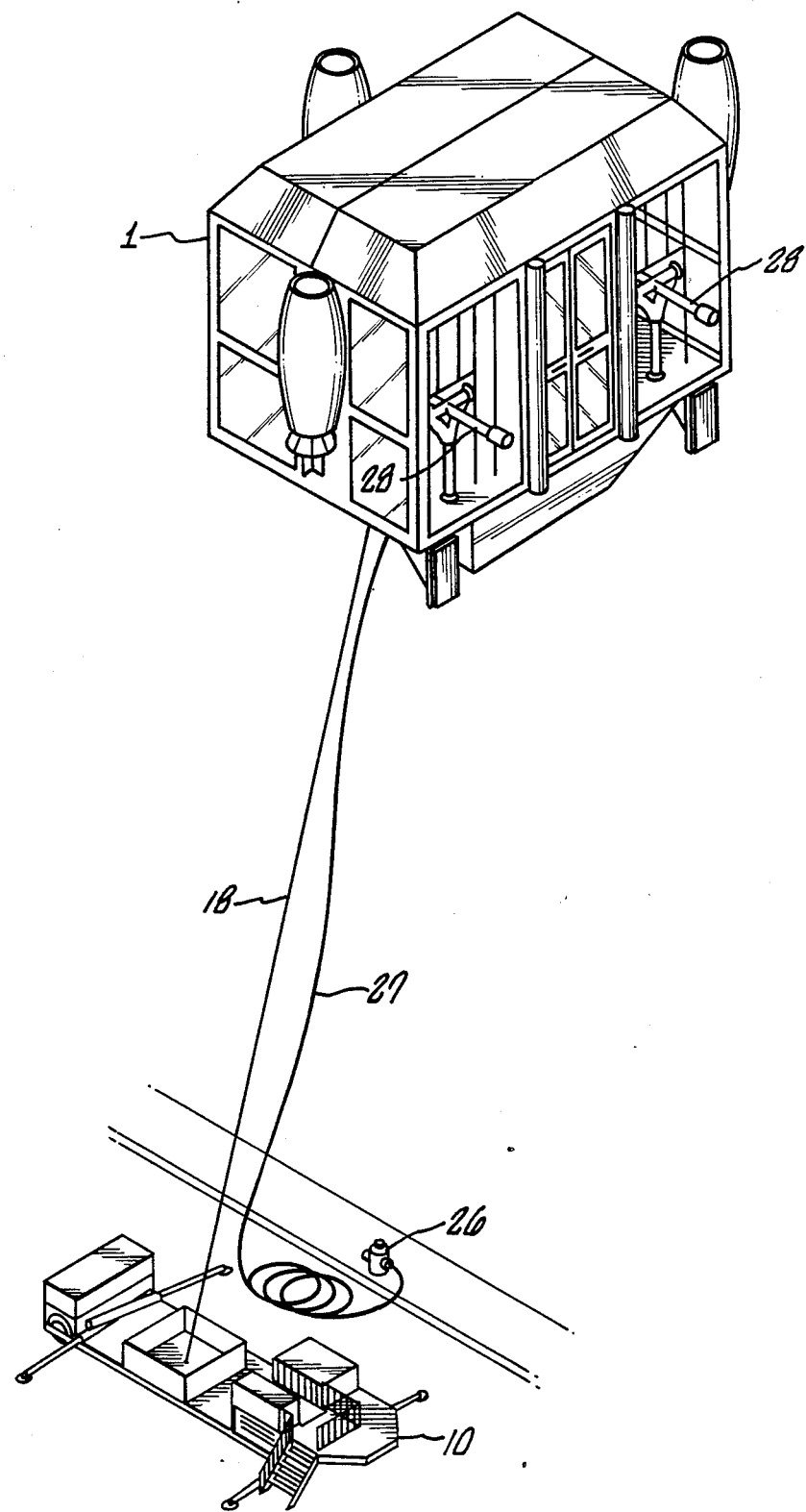
FIG. 8 is a perspective view of a rescue craft and ground structure being used in fire-fighting operations.

Referring to FIG. 1, a rescue craft comprises a module 1 to which are mounted three fan-jet engines 2 providing power means for raising the module 1 above ground level. The module 1 includes sliding doors 3 for ingress and egress of fire-fighting personnel and persons to be rescued. The craft is provided with a pair of heavy-duty tubular rubber bumpers 4 to absorb impact during docking operations and provide a seal between the craft and the building. Docking struts 5 are also provided to assist in attaching the craft to a window sill or a roof ledge as further discussed below. The rescue craft is also provided with a base assembly 6 and a roof canopy 7 covering a set of parachutes which may be rocket-deployed instantly in the event of engine failure, allowing the craft to make a safe landing.

Referring to FIGS. 2 and 3, a winch assembly 8 and a diesel engine 9 drivably connected to the winch 8 are mounted on a trailer 10. The trailer 10 and the apparatus associated therewith comprise a ground structure for the rescue craft. Included with the ground structure are four hydraulic cylinder outriggers 11 mounted on the trailer 10. The outriggers 11 are driven by a hydraulic pump (not shown), which is driven in turn by the diesel engine, and extend and retract approximately eight feet on each side to contact the ground and provide stability for the ground structure. Diesel fuel tanks 12 and ballast 13 are also provided, as are a rolling boarding ramp 14, guard railings 15 and an exit ramp ladder 16.

A rotational base 17 provides a mounting surface for the craft upon the base structure. The rotational base 17 can be oriented in a transport position and a launch and retrieve position rotated 90° from the transport position.

FIG. 4 depicts the rescue craft in flight. A tether cable 18 is used to provide stability and facilitate descent of the craft to ground level. The tether cable runs from the winch assembly 8, which is fitted with a level wind system to allow the cable to payout and return onto the drum evenly. From the winch assembly 8, the cable 18 runs under the floor of the trailer 10 and up through a sheave and forged shoe assembly, allowing the cable to pay out and return smoothly, even at angles as high as 45 degrees.

As shown in FIG. 5, fuel tanks 19 are mounted under the floor section of the module 1 and hold a minimum of fuel in order to reduce weight. Additional fuel tanks are mounted on the trailer 10 to enable refueling of the rescue craft while unloading people on the launch pad. A set of hydraulic docking cylinders 20, docking mechanisms 21 and docking locking arms 22 mounted underneath the module 1 attach to a window sill or a roof ledge and hold the craft securely to a building while loading people on board.

In operation, the smooth controllable power of the fan-jet engines will allow the craft to ascend or descend smoothly and slowly or quickly as desired. The smooth and controllable power of the winch and tether cable allows the craft to maintain ground-controlled elevations at all times and provides smooth ascent and descent. The craft is equipped with controls 23 operated by the pilot 24. Additional controls may be provided for a flight engineer to enable simultaneous and individual control of the engines, winch and guidance control systems of the craft. Internal guidance louvers 25 direct the exhaust flow of the fan-jet engines to provide the guidance system to maneuver the craft in any direction 360° above and around the tether, and to perform the docking procedures against buildings. During docking operations, flight attendants would assist persons in boarding and unloading and provide ear protection from the noise of the jet engines, as well as medical attention.

Turning to FIGS. 6, 7 and 8, a rescue craft is provided with fire-fighting equipment. A fire hydrant 26 provides water to a fire-hose 27 attached to the rescue craft. Swivel mounted hose nozzles 28 are used to direct water to a burning building. Also provided are a swivel 29, along with a hose connection 30, a safety cage 31, a hose control 32 and a hose connection fitting 33.

Thus, a rescue craft is disclosed which is adapted to rescue persons from buildings, ledges or the like. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A rescue craft for rescuing persons from a building comprising a flying module having a plurality of jet engines mounted thereon to propel said module to a predetermined elevation, said module being configured to receive a cargo of persons, said module further having a building interface portion comprising an opening to allow persons to climb from a building window into said module and engagement means to positionally engage said module with a building during module loading, control means to maneuver said module, a ground-based support structure adapted to support said module when not in flight, and retaining mans to retain said module at said predetermined elevation, said retaining means extending from said module to said ground-based support structure.

2. The rescue craft set forth in claim 1 wherein said control means include guidance louvers associated with said jet engines.

3. The rescue craft set forth in claim 1 wherein said retaining means comprise a cable mounted to the underside of said craft.

4. The rescue craft set forth in claim 1 further including nozzle means for directing a stream of liquid.

5. A rescue craft comprising a flying module adapted to receive a cargo of persons, said module having a building interface portion comprising an opening to allow persons to climb from a building window into said module and engagement means to positionally engage said module with a building during module loading, a plurality of fan jet engines mounted on said module to propel said module to a predetermined elevation, control means associated with said fan jet engines to maneuver said module, a base structure adapted to remain at or near ground level and to support said module when said module is not in flight and retaining means extending between said module and said base structure to retain said module at said predetermined elevation and to assist in lowering said module.

6. The rescue craft set forth in claim 5 wherein said building interface portion of said module includes doors disposed in one side thereof and said module engagement means comprise resilient bumpers disposed adjacent said doors.

7. The rescue craft set forth in claim 5 wherein said module engagement means includes docking struts disposed on one side of said module, locking arms laterally disposed from said docking struts and a docking mechanism and docking cylinders drivably connected to said locking arms.

8. The rescue craft set forth in claim 5 wherein said module includes an emergency parachute.

9. The rescue craft set forth in claim 5 wherein said module includes a fuel tank.

10. The rescue craft set forth in claim 5 wherein said retaining means includes a winch disposed on said base structure, drive means mounted on said base structure for powering said winch, and a cable extending between said winch and said module.

11. The rescue craft set forth in claim 5 wherein said base structure comprises a trailer and includes outriggers extending laterally from said trailer, and, mounted to said trailer, ballast, fuel tanks, a boarding ramp, a guard railing, an exit ramp ladder, and a rotational base adapted to support said module.

12. The rescue craft set forth in claim 5 wherein said module includes means for attaching a hose and for directing a liquid.

13. A rescue craft comprising a module adapted to receive persons, jet engines attached to said module to propel said module to a predetermined elevation, internal guidance louvers associated with said engines to maneuver said module, a door disposed in said module, bumpers disposed adjacent said door, docking struts disposed on one side of said module, locking arms laterally disposed from said docking struts, a docking mechanism and docking cylinder driveably connected to said locking arms, an emergency parachute mounted to said module, a fuel tank mounted to said module, a base structure adapted to support said module, outriggers mounted to said base structure, ballast disposed on said base structure, fuel tanks disposed on said base structure, a boarding ramp disposed on said base structure, an exit ramp ladder disposed on said base structure, a rotational base adapted to support said module disposed on said base structure, a winch disposed on said base structure, drive means mounted on said base structure for powering said winch, and a cable extending between said winch and said module to retain said module at said predetermined level and to assist in lowering said module.

14. A rescue craft comprising a flying module configured to carry a cargo of persons, said module having a building interface portion comprising an opening to allow persons to climb from a building window into said module and engagement means to positionally engage said module with a building during module loading, power means to proper said craft to a predetermined elevation, control means to maneuver said module, a ground-based support structure adapted to support said module when not in flight, and retaining means to retain said module at said predetermined elevation, wherein said power means comprise at least three fan jet engines mounted to the sides of said module, wherein said control means include guidance louvers mounted to an exhaust portion of said engines and wherein said retaining means comprise a single tether cable extending from said module to a winch mounted on said ground-based support structure.

15. A rescue craft comprising a flying module adapted to receive persons, a plurality of fan jet engines mounted on said module to propel said module to a predetermined elevation, control means associated with said power means to maneuver said module, a base structure adapted to support said module, and retaining means extending between said module and said base structure to retain said module at said predetermined elevation and to assist in lowering said module, said base structure comprising a trailer and including outriggers extending laterally from said trailer, and, mounted to said trailer, ballast, fuel tanks, a boarding ramp, a guard railing, and exit ramp ladder and a rotational base adapted to support said module.

16. A rescue craft comprising a flying module adapted to receive persons, a plurality of fan jet engines mounted on said module to propel said module to a predetermined elevation, control means associated with said fan jet engines to maneuver said module, a base structure adapted to remain at or near ground level and to support said module when said module is not in flight and retaining means extending between said module and said base structure to retain said module at said predetermined elevation and to assist in lowering said module, said base structure comprising a trailer having outriggers extending laterally therefrom and having fuel tanks, a boarding ramp, a guard railing, an exit ramp ladder and a rotational base adapted to support said module mounted thereon.

17. A rescue craft comprising a flying module adapted to receive a cargo of persons, a plurality of fan jet engines mounted on said module to propel said module to a predetermined elevation, control means associated with said fan jet engines to maneuver said module, a base structure adapted to remain at or near ground level and to support said module when said module is not in flight and retaining means extending between said module and said base structure to retain said module at said predetermined elevation and to assist in lowering said module, said base structure comprising a trailer and including outriggers extending laterally from said trailer, and mounted to said trailer, ballast, fuel tanks, a boarding ramp, a guard railing, an exit ramp ladder, and a rotational base adapted to support said module.

* * * * *